No. 757,746. PATENTED APR. 19, 1904.
H. HOWE.
CAR FENDER.
APPLICATION FILED DEC. 10, 1903.
NO MODEL.
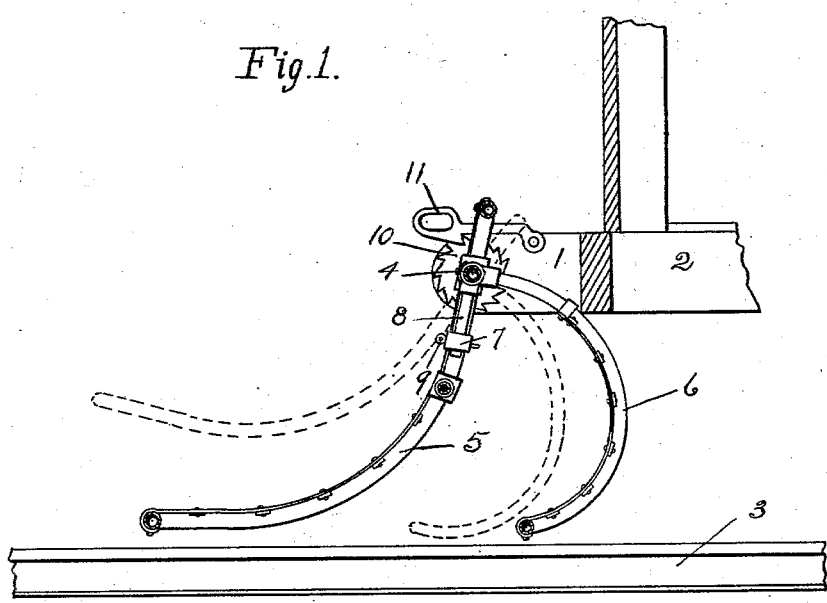
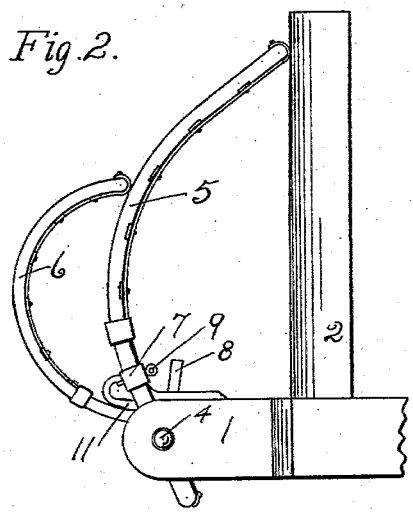
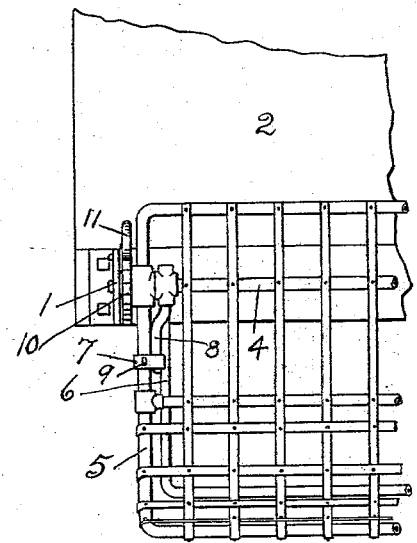
Witnesses:
David C. Walter
Powell Schreiber
Inventor
Harry Howe,
By Owen & Owen,
His attorneys.

No. 757,746. Patented April 19, 1904.

UNITED STATES PATENT OFFICE.

HARRY HOWE, OF TOLEDO, OHIO.

CAR-FENDER.

SPECIFICATION forming part of Letters Patent No. 757,746, dated April 19, 1904.

Application filed December 10, 1903. Serial No. 184,594. (No model.)

*To all whom it may concern:*

Be it known that I, HARRY HOWE, a citizen of the United States, and a resident of Toledo, in the county of Lucas and State of Ohio, have invented certain new and useful Improvements in Car-Fenders; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in car-fenders of the class in which the raising of a main or tripping fender is employed to operate a dropping or auxiliary fender should a person or other obstacle pass in under the forward fender instead of being picked up thereby, and is especially designed for use on city and suburban cars propelled by electricity or other mechanical power.

The object of my invention is to simplify and cheapen the construction of fenders of this class by causing the main and auxiliary fenders to be so connected that a movement of one imparts a positive corresponding movement to the other and to provide improved means for causing said fenders to be retained in any position to which they have been moved until released by the motorman or other person.

A further and most important object of my invention is to provide a fender of this class that is so constructed and attached to a car as to adapt it to be readily and easily folded into a compact form against the body of said car when it is desired to couple with another car or reverse the direction of movement of the car to which the fender is attached.

The invention consists in the provision of a common shaft or axis upon which the main and auxiliary fenders are adapted to rotate and in so constructing and connecting the said fenders as to adapt them to be carried in operative position or be folded in compact form against the car-body when not in use, as will be more particularly described in the following specification, of which the accompanying drawings form a part, and in which—
Figure 1 is a vertical sectional view of my fender, showing it in operative position with relation to a car. Fig. 2 is a vertical side elevation of the same, showing it in folded position with relation to a car; and Fig. 3 is a partly-sectional front elevation thereof in operative position.

Referring to the drawings, 1 represents the fender-supporting brackets, which are secured in any suitable manner to the end of the car 2 and project forward from either side thereof, and 3 represents one of the rails on which the car is mounted.

A transverse shaft 4, which has its ends journaled in suitable bearings provided in the brackets 1, is adapted to form a common axis for the main or forward fender 5, which is preferably rigidly mounted thereon, and the rear or auxiliary fender 6, which is loosely mounted thereon. The main fender 5 has its upper portion extended slightly above its point of connection with said shaft and its lower portion extended downwardly and forwardly therefrom to adapt it to normally remain in contiguous position to the rails 3, while the auxiliary fender 6 extends rearwardly from said shaft in a downwardly-curved line which terminates in a forwardly-projecting portion having its lower edge in contiguous position to said rails, substantially as shown in Fig. 1. The fender 6, which is loosely mounted on said shaft 4 to permit of its being compactly folded against the main fender 5 when not in use, is adapted to be retained in proper rigid position with relation to said main fender by means of the sliding sleeves 7, which are mounted on either side of the frame of said forward fender and adapted to engage the arms 8, which project downwardly from the upper end of the fender 6, the said sleeves being locked from movement on said parts by means of the pins 9, which pass through apertures provided in said sleeves and frame.

The axial rotation of the fenders 5 and 6 is controlled by means of a ratchet 10 and dog 11, which are mounted on the shaft 4 and brackets 1, respectively, at either side of the fender 6, the said dogs being adapted to engage the upper side of said ratchets, as shown in Fig. 1. By the use of this means the fenders 5 and 6 are retained in folded position against the car-body or in any other position to which they may be moved by reason of the fender 5 passing over an obstacle on the track, the same being released by the motorman or other person disengaging the dog 11 when desired.

It will be apparent that the frames of the fenders 5 and 6 may be made of tubing, angle-iron, or other suitable material and provided with any convenient or serviceable form of netting, such as wire, flat metal strips, or the like.

In the use of my improved fender it will be apparent that should the main fender 5 pass over a person or other obstacle on the tracks the said fender will be raised and the auxiliary fender 6 caused to have a corresponding axial movement, thereby bringing the lower portion thereof forward in position to pick up and retain said person or obstacle, as shown by the dotted lines in Fig. 1, the said fenders being retained in the position to which they have been moved by means of the ratchet and dog 10 and 11.

It will be seen that my invention is perfectly automatic in its action, not depending upon the motorman to release it for the purpose of picking up an obstacle as it is approached; that it may be folded into a compact form against the body of the car and retained in this or any other position to which it is elevated, and that by reason of the main and auxiliary fenders being mounted on a common axis the construction is materially simplified and cheapened and the use of the several shafts and connecting parts commonly used in fenders of this class is obviated.

It is obvious that such changes in the form, proportion, and minor details of construction of the parts as fairly fall within the scope of my invention may be made without departing from the spirit or sacrificing any of the advantages thereof.

Having thus described my invention, what I claim as new, and desire to secure by Letters Patent, is—

1. A device of the class described, comprising a main and an auxiliary fender suspended from a common axis, the said auxiliary fender being adapted to follow said main fender in adjacent position to the track for the purpose described.

2. A car-fender having a main and an auxiliary fender rotatably mounted on a common axis, the said auxiliary fender being adapted to approach the track as the former is raised.

3. A car-fender having a main and an auxiliary fender suspended from a common axis in juxtaposition to the track and adapted to be folded in compact form against the car-body to which they are attached.

4. A car-fender comprising a main and an auxiliary fender rotatably suspended from the body of a car with their lower portions in juxtaposition to the track and adapted to be folded in compact form against the front thereof, and means for locking said fenders in folded position.

5. A car-fender comprising main and auxiliary fenders rotatably mounted on a common axis, ratchet means for preventing a backward movement of said fenders after they have been elevated to a certain position, and means for retaining said fenders in either a rigid or a movable position with relation to each other.

6. A fender of the class described having the main and auxiliary fenders thereof pivotally mounted on a common axis, a dog and ratchet for controlling the movements of said fenders, means for locking said fenders in operative position or permitting them to be folded in compact form against the car-body.

7. A fender of the class described, having a shaft mounted in a supporting-bracket, a main fender mounted on said shaft, a second fender mounted on said shaft and extending to the rear of said first fender, means adapted to retain said fenders in rigid position or permit an independent movement thereof, and ratchet means for controlling the movements of said fenders, substantially as described.

8. A fender of the class described, comprising a shaft, a main and an auxiliary fender mounted on said shaft and adapted to be locked together in operative positions, a ratchet-pinion mounted on said shaft and adapted to rotate with said fenders, and a dog for engaging said pinion, substantially as described.

9. A fender of the class described, comprising rotatable main and auxiliary fenders mounted on a common shaft, arms projecting from said auxiliary fender in juxtaposition to said main fender, means adapted to engage said arms and retain said auxiliary fender in rigid position with relation to said main fender, and means for retaining said fenders in any position to which they may be moved, substantially as described.

In testimony whereof I have hereunto signed my name to this specification in the presence of two subscribing witnesses.

HARRY HOWE.

Witnesses:
WILBER A. OWEN,
CORNELL SCHREIBER.